(12) United States Patent
Song et al.

(10) Patent No.: US 8,802,168 B2
(45) Date of Patent: Aug. 12, 2014

(54) FLAVOR RELEASING CORES AND THEIR USE IN CHEWING GUM

(75) Inventors: Joo H. Song, Chicago, IL (US); Holly A. Knutsen, Palos Park, IL (US); Kevin B. Broderick, Berwyn, IL (US); Donald A. Seielstad, Frankfort, IL (US)

(73) Assignee: WM, Wrigley Jr. Company, Chicago, IL (US)

( * ) Notice: Subject to any disclaimer, the term of this patent is extended or adjusted under 35 U.S.C. 154(b) by 1309 days.

(21) Appl. No.: 12/447,551

(22) PCT Filed: Oct. 18, 2007

(86) PCT No.: PCT/US2007/081757
§ 371 (c)(1),
(2), (4) Date: Apr. 28, 2009

(87) PCT Pub. No.: WO2008/055006
PCT Pub. Date: May 8, 2008

(65) Prior Publication Data
US 2010/0055231 A1  Mar. 4, 2010

Related U.S. Application Data

(60) Provisional application No. 60/855,937, filed on Oct. 31, 2006.

(51) Int. Cl.
A23G 4/00 (2006.01)
(52) U.S. Cl.
USPC .................................................. 426/3
(58) Field of Classification Search
USPC ........................................ 426/3, 4, 6, 5, 516
See application file for complete search history.

(56) References Cited

U.S. PATENT DOCUMENTS

| 4,713,243 | A | * | 12/1987 | Schiraldi et al. ............... 424/676 |
| 4,978,537 | A | * | 12/1990 | Song ................................. 426/5 |
| 5,128,155 | A | | 7/1992 | Song et al. |
| 5,431,950 | A | | 7/1995 | Fuisz |
| 5,433,960 | A | * | 7/1995 | Meyers ............................ 426/5 |
| 5,470,581 | A | | 11/1995 | Grillo et al. |
| 5,601,865 | A | | 2/1997 | Fulger et al. |
| 5,792,505 | A | | 8/1998 | Fulger et al. |
| 5,958,502 | A | | 9/1999 | Fulger et al. |
| 6,428,827 | B1 | | 8/2002 | Song et al. |
| 6,479,082 | B1 | | 11/2002 | Johnson |
| 2006/0193946 | A1 | | 8/2006 | Gebreselassic et al. |

FOREIGN PATENT DOCUMENTS

| EP | 1 457 522 A | 9/2004 |
| WO | WO 94/14330 A | 7/1994 |
| WO | WO 96/09773 A | 4/1996 |
| WO | WO 98/27826 A | 7/1998 |
| WO | WO 00/59314 A | 10/2000 |

* cited by examiner

Primary Examiner — Humera Sheikh
Assistant Examiner — Tynesha McClain-Coleman
(74) Attorney, Agent, or Firm — Brinks Gilson & Lione; Steven P. Shurtz

(57) ABSTRACT

Flavor releasing structures for chewing gum have about 30% to about 60% thermoplastic cellulose material, about 5% to about 50% non-cellulosic thermoplastic polymer, and about 10% to about 40% porous flavor reservoir material. Optionally the flavor releasing structure may comprise about 5% to about 25% plasticizer. The cores may be coated with a flavor barrier coating.

31 Claims, No Drawings

FLAVOR RELEASING CORES AND THEIR USE IN CHEWING GUM

REFERENCE TO EARLIER FILED APPLICATION

The present application claims the benefit of the filing date under 35 U.S.C. §119(e) of U.S. Provisional Patent Application No. 60/855,937, filed Oct. 31, 2006, the disclosure of which is incorporated, in its entirety, by this reference.

FIELD OF THE INVENTION

The invention relates to flavor releasing structures for use in chewing gums. More particularly, the present invention relates to flavor-releasing structures for chewing gums that have at least one porous flavor reservoir material, at least one thermoplastic cellulose material, and at least one non-cellulosic thermoplastic polymer, and optionally at least one plasticizer.

BACKGROUND OF THE INVENTION

The present invention is an advance in the art of structures for use in chewing gums that gradually release a flavoring agent while the gum is chewed. These structures can provide improved flavor releasing characteristics during the latter portions of chewing and can provide greater flavor recovery than conventional means of delivering flavoring agents. Normally, gum containing a flavoring agent will exhibit a very strong rapid flavor release in the beginning periods of chewing. After this initial flavor release, the flavor release dramatically decreases. The structures embodying the present invention can provide a significant flavor release during the later periods of chewing, when the conventional gum's flavor release has diminished. Additionally, by varying the composition of the flavor releasing structure, different flavor release characteristics can be obtained.

SUMMARY OF THE INVENTION

A chewing gum having flavor releasing structures is provided. The gum comprises a gum base, a water soluble bulk portion, and a flavor releasing structure. The flavor releasing structure comprises a porous flavor reservoir material, a binding material, which can be both a non-cellulosic thermoplastic polymer and a thermoplastic cellulose material, and optionally a plasticizer. These materials form the core of the flavor releasing structure. The flavor reservoir material is dispersed in the binding material and is bound by it. At least one of the materials releasably retains a flavoring agent.

In a first aspect, the invention is a method of making a long flavor duration releasing structure for chewing gum comprising preparing a blend comprising a thermoplastic cellulose material, a non-cellulosic thermoplastic polymer, and a porous flavor reservoir material to form a generally homogeneous composition; mixing the blend and melting the non-cellulosic thermoplastic polymer and thermoplastic cellulose material in an extruder to form a flavor releasing composition; extruding and cooling the flavor releasing composition; sizing the cooled flavor releasing composition; and incorporating flavor into the flavor releasing composition to form flavor releasing cores.

In a second aspect, the invention is a long flavor duration releasing structure comprising about 30% to about 60% thermoplastic cellulose material, about 5% to about 50% non-cellulosic thermoplastic polymer, and about 10% to about 40% porous flavor reservoir material; and a flavoring agent incorporated into the structure.

In a third aspect, the invention is a chewing gum composition with long flavor duration comprising a gum base; a water soluble bulk portion; and a flavor releasing structure comprising: i) about 30% to about 60% thermoplastic cellulose material, about 5% to about 50% non-cellulosic thermoplastic polymer, and about 10% to about 40% porous flavor reservoir material; and ii) a flavoring agent incorporated into the structure.

DETAILED DESCRIPTION OF EMBODIMENTS OF THE INVENTION

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

In the context of this invention, chewing gum refers to chewing gum, bubble gum and the like. Moreover, all percentages are based on weight percentages unless otherwise specified. Molecular weights specified are weight average molecular weights.

An embodiment of a structure made in accordance with the present invention is a gum having flavor releasing structures made by extruding a mixture of a thermoplastic cellulose material, a non-cellulosic thermoplastic polymer, a porous flavor reservoir material and optionally a plasticizer.

One of the support materials can be a thermoplastic cellulose material. This material will deform or melt, becoming flowable at the temperatures and pressures used in the extruder, as will the non-cellulosic thermoplastic polymer. Another material used is a porous flavor reservoir material. The flavor releasing structure has at least these three materials that form the core of the structure. A fourth material optionally used is a plasticizer, which aids in the processing of the other materials.

In a process used to make the cores, the thermoplastic cellulose material, non-cellulosic thermoplastic polymer, porous flavor reservoir material and optional plasticizer materials are mixed together and added to a hopper which feeds the extruder. The increased temperature and shear within the extruder cause the thermoplastic materials to become flowable. Once the mixture has become flowable it is then forced through a die to form an extrudate. The extrudate should be cooled immediately after extrusion. This can be accomplished by collecting the extrudate on a stainless steel belt conveyor with chilling capabilities. The extrudate is then ground and sieved if needed, to provide cores of a desired size.

Various proportions of thermoplastic and porous flavor reservoir materials can be used. Normally, when using a cellulosic material and silica, a maximum of 40% silica (based on the total weight of the mixture) can be used.

In addition to extrusion, other processes can be used to form the cores. For example, the materials can be combined in a heated pressure vessel, heated to a temperature at which the thermoplastic becomes flowable and mixed. Upon cooling, the resulting material can be ground and sieved if needed to provide cores of a desired size.

Grinding can be accomplished by means known to the art. For example a Mikropul or Fitzmill mill can be used. On large scale operations, where heat build may become a concern, cryogenic grinding can be used. Environmental exposure of the extrudate to high humidity before or after grinding may reduce the cores ability to hold flavoring agent and may increase handling difficulties.

The cores have at least two matrices. One matrix is comprised of the porous flavor reservoir material and the other matrix is comprised of the thermoplastic cellulose and non-cellulosic thermoplastic polymer materials. The porous flavor reservoir matrix is dispersed throughout the thermoplastic matrix. The ratio of thermoplastic materials to porous flavor reservoir material is generally between about 10:1 and about 1:1 by weight. The thermoplastic material functions as a binding material for the porous flavor reservoir material in the core. The first binder, the thermoplastic cellulose material, binds the flavor releasing structure together, and will generally comprise about 30% to about 60% of the core before the flavor is added. The second binder, the non-cellulosic thermoplastic polymer, such as a thermoplastic commonly used in chewing gum base, helps bind the flavor releasing structure together while it is in the chewing gum matrix and during chewing. At high levels of usage, over about 1% in gum, hydroxypropylcellose (HPC) has a tendency to disrupt the gum base matrix and causes the gum to be very soft during chewing. The addition of the second binder reduces or eliminates this effect. The level of the second binder may be about 5-50% and preferably about 10-40% by weight of the core before the flavor is added. The thermoplastic material forms a matrix larger than the porous flavor reservoir material and supports and incorporates the porous flavor reservoir material. Thus, the porous flavor reservoir material may be enclosed in the thermoplastic material to varying degrees. Some of the porous flavor reservoir material may be completely enclosed in the thermoplastic material, some may only be partially enclosed in the thermoplastic material and some may be substantially unenclosed in the thermoplastic material.

The thermoplastic materials can differ in their water solubility (how quickly they will dissolve in water) compared to the porous flavor reservoir material. This difference may affect the release rate of the flavoring agent. The porous flavor reservoir material may be essentially water insoluble. For example, silica can be used as the porous flavor reservoir support material. On the other hand, the thermoplastic material may be water soluble or water swellable, but should have a relatively slow rate of dissolution. The water solubility of these materials will have an effect on the release rate of the flavoring agent. Generally, all other factors remaining the same, the higher the water solubility of the thermoplastic materials the faster the release rate of the flavoring agent.

A specific thermoplastic cellulose material is cellulose 2-hydroxypropyl ether, which is called hydroxypropylcellulose. Hydroxypropylcellulose is sold by Aqualon Co., a subsidiary of Hercules Inc., under the trademark KLUCEL®. Hydroxypropylcellulose is available in different molecular weights. Varying the molecular weight affects the release characteristics of the cores. For example, Klucel HF has a molecular weight of 1,500,000 and will give a slow flavor release, and Klucel EF has a molecular weight of 80,000, and will give a faster flavor release. Combinations of the two will give intermediate rates of flavor release. Another example of a thermoplastic cellulose material is hydroxypropyl hydroxyethylcellulose. This product is sold by Aqualon Co. under the trademark Natrovis®. One aspect to consider in choosing a thermoplastic material is the degree to which the flavoring agent may plasticize the thermoplastic. If too much plasticization takes place the cores could become difficult to process.

Extrusion of the flavor cores will typically occur at about or above 150° C., usually with a plasticizer, or preferably about 180° C. to 200° C. with plasticizer, or may be as high as 230° C. without the plasticizer. Therefore the non-cellulosic thermoplastic polymers that are stable at these conditions should be used. Food-grade high molecular weight (MW) polyvinyl acetate (PVAc), above 55,000 in MW, is an effective second binder. Preferably, the MW of PVAc should be about 80,000 to 120,000, but higher MW may be used. PVAc has been found to be very effective for use with mint type flavors. However, because of the affinity for some flavors, such as cinnamic aldehyde and fruit flavor ester, for PVAc, another plastic polymer may be used. One such polymer is polyethylene (PE). The desired molecular weight of PE depends on the softening point and stability of PE, keeping in mind the high extrusion temperature used to make the flavor reservoir. Alternate and additional thermoplastic polymers that may be used include natural and synthetic gum elastomers such as polyisoprene, polyisobutylene, isobutylene-isoprene copolymer, styrene butadiene rubber, polypropylene, polyterpenes and the like.

The porous reservoir material is one that is not miscible with plastic polymers. There are three types of materials that will function and have properties necessary for the reservoir material. These materials form discrete, porous domains within the matrix. One is naturally porous, such as silica. Another is not inherently porous, but may become porous when agglomerated, such as calcium carbonate. The third is a material, such as maltodextrins, which cools from a melt to form an amorphous, porous structure. The porous flavor reservoir material must be capable of absorbing, adsorbing, retaining or serving as a reservoir for, the flavoring agent. It will generally comprise about 10% to about 40% of the cores before the flavor is added. Nevertheless, the ability to retain the flavoring agent should not be so great that this material will not release the flavoring agent when chewed in a gum. This can be accomplished by several types of materials. For example, the porous flavor reservoir material can consist of small particles with microporous structures, it can consist of the compositions disclosed in U.S. Pat. No. 4,497,832, it can consist of small particles with very high surface areas or it can contain a combination of any of these types of materials or properties.

Examples of materials that can be used as flavor reservoir materials are: silicas, such as synthetic amorphous silicon dioxide, SYLOID® 244FP, and SYLOID® 74FP, another silicon dioxide, both of which are available from GRACE Davison Products; talc; titanium dioxide; calcium carbonate; mannitol; maltodextrins; starches; microsponges such as those supplied by Advanced Polymer Systems, Co.; zeolites; amorphous clays; and carbon black. Other absorbent type materials that are stable at 200° C. can also be used. When cinnamic aldehydes are used for the flavor, the flavor reservoir material that is used should be one that does not react with the cinnamic aldehyde.

The flavor releasing structure will optionally include a plasticizer. Generally the plasticizer will comprise up to about 25% of the cores before the flavor is added Glycerol monostearate may be added to the thermoplastic and porous flavor reservoir core ingredients. By adding a plasticizer such as glycerol monostearate to the thermoplastic cellulose material, non-cellulosic thermoplastic polymer and porous flavor reservoir material, the extrusion process of the extrudate is easier. Besides glycerol monostearate, other plasticizers such as lecithin, mono and diglycerides, glyceryl lactopalmitate, sorbitan monostearate, triglyceride monostearate, octaglycerol monooleate, polysorbates 65, 60, and 80, acetylated monoglycerides, distilled monoglycerides, distilled propylene glycolmonoester and succinylated monoglycerides may be used.

The flavoring agent can be added to the cores before, during or after their formation. When the flavoring agent is added before extrusion, however, care must be taken to keep the temperatures low enough to prevent the degradation or vaporization of the flavoring agent. The flavor can be added after the extrusion, when the flavor releasing composition has been cooled. Usually the extruded material will be sized to less than about 40 mesh and greater than about 200 mesh. The flavor can be added before or after the sizing step. The success of these various orders of addition will depend on several factors, including the results sought to be obtained, the process conditions under which the core is formed, the materials used, and the flavoring agents used.

The flavoring agent can be added after formation by soaking the cores in a beaker of flavoring agent. Another method of adding flavoring agent is by misting the flavoring agent over the cores. Although these methods will work, it is preferred to obtain as homogeneous a distribution of the flavoring agent in the cores as is possible. One such way to obtain a homogeneous distribution is by using a Littleford Plough mixer or Ribbon blender. A Cone Shell Blender is another type of mixer that will achieve the desired uniform distribution of flavoring agent in the core. A mixer with a chopper may be preferred if the chopper is needed to break up pieces that start to agglomerate together during mixing. Although in most cases the flavoring agent will be absorbed into the cores very rapidly, it is desirable to allow the cores to mix for a sufficient time to reach equilibrium.

The flavoring agent is releasably retained by the cores, to the extent that it is released when gum containing the flavor releasing structures is chewed. Both the thermoplastic matrix and the porous flavor reservoir matrix can releasably retain the flavoring agent. Additionally, different and multiple flavoring agents may be used in a single core. The cores can contain very large amounts of flavoring agent. For example, cores may be made that contain about 10% to about 40% flavoring agent based on the total weight of the core. Higher loadings are usually obtained when the flavoring agent is added to the core after it is formed, compared to when the flavoring agent is added during formation. About 33% loading, based on the total weight of the core, is one specific example of loading. Color may also be loaded onto the cores, or coated on the cores after the flavor is loaded.

Flavoring agents may comprise essential oils, synthetic flavors, or mixture thereof including but not limited to oils derived from plants and fruits such as citrus oils, fruit essences, peppermint oil, spearmint oil, clove oil, oil of wintergreen, anise, and the like. Artificial flavoring agents are also contemplated. Those skilled in the art will recognize that natural and artificial flavoring agents may be combined in any sensorially acceptable blend. All such flavors and flavor blends are contemplated by the present invention, including by way of example, peppermint, spearmint, wintergreen, orange, blueberry, grape, strawberry, raspberry, lime, lemon, cherry, citrus, apple, pear, peach, plum, cola, licorice, cinnamon, menthol, clove, nut, vanilla, anise, bay, and eucalyptus. In addition, sensates, such as cooling agents, warming agents and tingling agents, may be added with the flavor. High-intensity sweeteners that are mixable with the flavor may also be added with the flavor to the cores.

Once the flavoring agent is retained in the core, the core can be coated with a flavor barrier coating. The coating increases the shelf life of the flavor releasing structure when it is incorporated into a chewing gum. The coating also aids in handling and processing the cores by preventing the flavor from evaporating. The coating can prevent the flavor from migrating into the gum and can protect chemically sensitive flavoring agents from reacting with the ingredients of the gum. The coating can also affect the release rate of the flavoring agent.

Generally, any natural or synthetic material that exhibits a flavor barrier characteristic can be used for the coating. Coating materials that have a high affinity for the flavoring agent are less desirable because they may draw the flavoring agent out of the core. Inert materials and hydrophilic materials are preferred for the coating. For example, the coating can be: waxes such as the following that are sold by Petrolite Corp., Ultraflex, Victory, Be Square 175, Be Square 185, Be Square 195, Starwax 100, Petrolite L-700, Petrolite L-1030, and Mekon White; polymer and wax combinations such as the following that are sold by Petrolite Corp., Polywax 500, 655, 1000, and 2000; synthetic polymers, such as the following that are sold by Petrolite Corp., Petrolite C-4040, CP-7, CP-11, CP-12 and Vybar 825, 260, 253, 103, 373; hydrophilic materials such as sugar, gelatins, gum Arabic, alginates, chitosan, corn syrup, starch, cellulose (methyl-cellulose), carrageenan, polyvinyl prolidone, polyvinyl alcohol, and ethylene vinyl alcohol copolymers (such as EVAL, which is a trade name of Evalca Co.); polyvinyl acetates; and polyethylene. The cores can be coated once or multiple times with the same coating material or successively with different coating materials.

When choosing waxes as coatings, the higher melting point waxes such as Starwax 100 exhibit superior flavor barrier characteristics to lower melting point waxes. Generally, any paraffin based wax with a melting point range of about 135°-200° F. can be useful as a coating.

The coating can be added by a rotating disk coater, by a fluidized bed coater, spray chilling or by a tumbler. If the cores stick together prior to coating, silica can be added to break them apart. Once the cores have been coated it may be necessary to further sieve the material through a 40 mesh sieve to remove any agglomerated coating material or to further size the cores for use in a gum. Fines smaller than 200 mesh may be excluded. A particle size between 40 and 80 mesh may be used.

Once the flavor releasing structure has been formed, it is then incorporated into a chewing gum. The flavor releasing cores will generally comprise between about 0.5% and about 5% of the gum composition. Addition to the gum mixer during the last stage of the mixing cycle may minimize any damage to the flavor releasing structures. If a wax coating is used, the wax may change the texture of the gum requiring modification of the gum base or formula.

Chewing gum consists of a gum base to which a water soluble bulk portion may normally be added. Chewing gum bases generally comprise a combination of elastomers and resins together with plasticizers and inorganic fillers.

The gum base may contain natural gums and/or synthetic elastomers and resins. Natural gums include both elastomers and resins. Suitable natural gums include, but are not limited to chicle, jellutong, sorva, nispero tunu, niger gutta, massaranduba belata, and chiquibul.

When no natural gums are used, the gum base is referred to as "synthetic" and the natural gums are replaced with synthetic elastomers and resins. Synthetic elastomers may include polyisoprene, polyisobutylene, isobutylene-isoprene copolymer, styrene butadiene rubber, and the like.

The amount of elastomer used in the gum base can typically be varied between about 10 and about 20 percent depending on the specific elastomer selected and on the physical properties desired in the final gum base. For example, the viscosity, softening point, and elasticity can be varied.

Resins used in gum bases may include polyvinyl acetate, polyethylene, ester gums, (resin esters of glycerol), polyvinyl acetate polyethylene copolymers, polyvinyl acetate polyvinyl laureate copolymers, and polyterpenes. Additionally, a polyvinyl acetate obtained from Monsanto under the designation "Gelva" and a polyterpene obtained from Hercules under the designation "Piccolyte" may be used.

As with the elastomer, the amount of resin used in the gum base can be varied depending on the particular resin selected and on the physical properties desired in the final gum base.

The gum base may also includes plasticizers selected from the group consisting of fats, oils, waxes, and mixtures thereof. The fats and oils can include tallow, hydrogenated and partially hydrogenated vegetable oils, and cocoa butter. Commonly employed waxes include paraffin, microcrystalline and natural waxes such as beeswax and carnauba. Additionally, mixtures of the plasticizers may be used such as a mixture of paraffin wax, partially hydrogenated vegetable oil, and glycerol monostearate.

The gum base may also includes a filler component. The filler component may be selected from the group consisting of calcium carbonate, magnesium carbonate, talc, dicalcium phosphate and the like. The filler may constitute between about 5 to about 60 percent by weight of the gum base. Preferably, the filler comprises about 5 to about 50 percent by weight of the gum base.

Further, gum bases may also contain optional ingredients such as antioxidants, colors, and emulsifiers.

These ingredients of the gum base can be combined in a conventional manner. In particular, the elastomer, resins, plasticizers, and the filler are typically softened by heating and then mixed for a time sufficient to insure a homogenous mass. The mass can be formed into slabs or pellets and allowed to cool before use in making chewing gum. Alternatively, the molten mass can be used directly in a chewing gum making process.

Typically, the gum base constitutes between about 5 to about 95 percent by weight of the gum. More preferably the insoluble gum base comprises between 10 and 50 percent by weight of the gum and most preferably about 20 to about 35 percent by weight of the gum.

In general, a chewing gum composition typically comprises a water soluble bulk portion added to the water insoluble chewable gum base portion. The flavoring agents are typically water insoluble. The water soluble portion dissipates with a portion of the flavoring agent over a period of time during chewing, while the burn base portion is retained in the mouth throughout the chew.

The water soluble portion of the chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in the chewing gum.

Sugar sweeteners generally include saccharide containing components commonly known in the chewing gum art which comprise but are not limited to sucrose, dextrose, maltose, dextrin, dried invert sugar, fructose, levulose, galactose, corn syrup solids, and the like, alone or in any combination. Non-sugar sweeteners can include sorbitol, mannitol, and xylitol.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time along with syrup and a portion of bulking agent. Further portions of the bulking agent are added with intense sweeteners or other powder additives, and flavors are added with the final portion of the bulking agent.

The entire mixing procedure typically takes about fifteen minutes, but longer mixing times may sometimes be required. Those skilled in the art will recognize that many variations of the above-described procedure may be followed.

The addition of a plasticizer to the thermoplastic and porous flavor reservoir core ingredients works very well to increase the production rate of the extrudate. Because of its anticaking properties, a plasticizer causes the thermoplastic ingredient to be more flowable in the extruder.

When the flavor releasing structures are added to chewing gum, they will gradually release the flavoring agent as the gum is chewed. The rate at which the flavoring agent is released can be varied by varying the molecular weight of the thermoplastic material. This can be contrasted with the normal manner of addition of flavoring agents to chewing gum in which the early rapid release of flavor occurs but without any subsequent increase.

The following examples are illustrative of embodiments of the invention

EXAMPLES

The flavor releasing structures were made using the following formulations in a ZSK-25 extruder:

|  | Comp Ex. A | Ex 1 | Ex 2 | Ex 3 | Ex 4 | Ex 5 | Ex 6 |
|---|---|---|---|---|---|---|---|
| Klucel HF | 60% | 57% | 54% | 57% | 54% | 48% | 48% |
| Silica (SYLOID ® 244FP) | 20% | 19% | 18% | 19% | 18% | 16% | 16% |
| Glycerol Monostearate | 20% | 19% | 18% | 19% | 18% | 16% | 16% |
| PVAc* | — | 5% | — | — | 10% | 20% | — |
| PVAc** | — | — | 10% | 5% | — | — | 20% |

*Molecular weight of PVAc was 55,000-75,000
**Molecular weight of PVAc was 272,000-310,000

The temperature profile for the ZSK-25 extruder was: 200° C., 195° C., 195° C., 204° C. and the extruder was run at 100 rpm. After extrusion, samples were ground in a Fitzmill, sieved through a 40 mesh, and loaded with 33% peppermint flavor. Each of the loaded flavor examples plus the comparative example was tested in two sugarless gum formulas shown below:

|                        | Formula A | Formula B |
|------------------------|-----------|-----------|
| Sorbitol               | 45.0%     | 41.5%     |
| Gum Base               | 33.0%     | 33.0%     |
| Calcium Carbonate      | 13.0%     | 13.0%     |
| Glycerin               | 4.0%      | 4.0%      |
| Peppermint flavor      | 2.2%      | 2.2%      |
| Lecithin               | 0.5%      | 0.5%      |
| Encapsulated Sweetener | 0.7%      | 0.7%      |
| Free sweetener         | 0.1%      | 0.1%      |
| Flavor release Structure | 1.5%    | 5.0%      |

Gum formulas were made by softening gum base, calcium carbonate, and sorbitol together in an oven at about 60° C. and added to a gum mixer. Lecithin and glycerin were added to the running mixer, and sweeteners added after 5 minutes. After 8 minutes, liquid flavor was added, and after 10 minutes, the inventive flavor structure was added. The gum was mixed for another 3 minutes, removed and sheeted into sticks.

Samples were bench level sensory screened. Test results suggested that higher levels of PVAc gave improved cohesion to gum formulas with a broader flavor release, and it was concluded that PVAc added to the flavor structure helped maintain the consistency of the gum during chewing.

Another series of flavor structures were prepared to evaluate higher levels of PVAc in the flavor structure and its effect. The following examples were made:

|                        | Comp Ex. B | Ex 7 | Ex 8 | Ex 9 | Ex 10 |
|------------------------|------------|------|------|------|-------|
| Klucel HF              | 60%        | 48%  | 45%  | 39%  | 30%   |
| Silica (SYLOID ® 244FP)| 20%        | 16%  | 15%  | 13%  | 10%   |
| Glycerol Monostearate  | 20%        | 16%  | 15%  | 13%  | 10%   |
| PVAc***                | —          | 20%  | 35%  | 35%  | 50%   |

***Molecule weight of PVAc was 80,000-110,000

The same temperature profile, as well as the rpm of the extruder, as in the previous examples was used. As previously done, samples were ground, sieved through a 40 mesh, and loaded with 33% flavor by blending flavor into the powder flavor structure in a V-blender for 13 minutes. It was observed that the loaded structures with the higher levels of PVAc appeared wetter and more dense.

The flavor structures were evaluated in gum formula A above and had good sensory qualities. Higher levels of PVAc gave a longer release of flavor and a slower release of sweetener. All experimental samples had a good cohesive gum texture, unlike the soft, slimy texture of the comparative example.

Another series of flavor structures samples were made to evaluate still higher levels of PVAc in the flavor structures to study the effect of fruit flavor on the flavor structures. The following examples were made:

|                         | Comp Ex. C | Ex 11 | Ex 12 | Ex 13 | Ex 14 |
|-------------------------|------------|-------|-------|-------|-------|
| Klucel HF               | 60%        | 45%   | 30%   | 15%   | —     |
| Klucel EF               | —          | —     | —     | —     | 45%   |
| Silica (SYLOID ® 244FP) | 20%        | 15%   | 10%   | 5%    | 15%   |
| Glycerol Monostearate   | 20%        | 15%   | 10%   | 5%    | 15%   |
| PVAc***                 | —          | 25%   | 50%   | 75%   | 25%   |

***Molecule weight of PVAc was 80,000-110,000

After extrusion, the structures were ground, sieved through a 40 mesh, and loaded with 33% fruit flavor, which was a combination of fruit esters and essential fruit oils. As flavor was added, the structures seem to be plasticized by the flavor and became very wet. In all four of the inventive examples, additional mixing in the V-Blender for another 30 minutes was needed in order to disperse the flavor. Example 13, at this high flavor loading, did not give a satisfactory flavor structure even after extended mixing. However, it is believed that this material would be satisfactory at lower flavor loading.

The Comparative Example C and the Examples 11, 12, and 14 were tested in the following sugar chewing gum formulation:

|                          | %    |
|--------------------------|------|
| Sugar                    | 52.9 |
| Gum Base                 | 21.0 |
| Dextrose Monohydrate     | 10.0 |
| 39 DE, 43 Be corn syrup  | 11.0 |
| Glycerin                 | 0.8  |
| Fruit flavor             | 0.8  |
| Encapsulated fruit flavor| 1.0  |
| Encapsulated sweeteners  | 0.2  |
| Lecithin                 | 0.1  |
| Color                    | 0.7  |
| Flavor structure         | 1.5  |

The presoftened gum base with the sugar, corn syrup, lecithin, color, and encapsulated flavors were added into the mixer. Glycerin and dextrose were added to the running mixer. Encapsulated sweeteners were added after 3 minutes and liquid flavor added after 6 minutes. The flavor structure was added after 8 minutes and the gum was mixed for another 3 minutes.

Sensory evaluation indicated that the flavor structures retained flavor for a longer period of time than the comparison sample, but as the flavor structure broke down during chewing there was a higher level of heavy essential oils and less volatile fruit esters. It was concluded that higher levels of PVAc gave a longer lasting flavor. All of the examples used to make gum had better texture than the comparison example.

In another series of samples, flavor structures were made with polyethylene to evaluate the flavor structures for use of fruit flavors. The following formulas were made:

|                         | Ex 15 | Ex 16 | Ex 17 | Ex 18 | Ex 19 |
|-------------------------|-------|-------|-------|-------|-------|
| Polyethylene****        | —     | 25%   | 50%   | 25%   | 50%   |
| Glycerol Monostearate   | 15%   | 15%   | 10%   | 15%   | 10%   |
| Silica (SYLOID ® 244FP) | 15%   | 15%   | 10%   | 15%   | 10%   |
| Klucel EF               | 45%   | 45%   | 30%   | —     | —     |
| Klucel HF               | —     | —     | —     | 45%   | 30%   |
| PVAc***                 | 25%   | —     | —     | —     | —     |

****Molecular weight of PE was 21,000
***Molecular weight of PVAc was 80,000-110,000

Extrusion of these materials showed less expansion during extrusion, and temperature was lowered for Examples 15, 16, and 17 for Klucel EF. Example 17 did not give a satisfactory matrix even at the lower temperatures, but may be satisfactory at even lower temperatures. Example 18 with Klucel HF and 25% polyethylene gave the best results even at higher temperatures.

Example 16, 18, and 19 were loaded with 33% fruit flavor and formed satisfactory flavor structures after about 15 minutes of mixing in a V-Blender, with Example 18 giving the best flavor structure. However, no gum formulas were prepared with these examples.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of invention is, therefore, indicated by the appended claims rather than by the foregoing description. All changes which come within the meaning and range of equivalency of the claims are to be embraced within their scope.

We claim:

1. A method of making a long flavor duration releasing structure for chewing gum comprising:
   a) preparing a blend comprising a thermoplastic cellulose material, a non-cellulosic thermoplastic polymer selected from the group consisting of polyvinyl acetate, polyethylene, and mixtures thereof, and a porous flavor reservoir material to form a generally homogeneous composition comprising about 30% to about 60% thermoplastic cellulose material, about 5% to about 50% non-cellulosic thermoplastic polymer, and about 10% to about 40% porous flavor reservoir material;
   b) mixing the blend and melting the non-cellulosic thermoplastic polymer and thermoplastic cellulose material in an extruder to form a flavor releasing composition;
   c) extruding and cooling the flavor releasing composition;
   d) sizing the cooled flavor releasing composition; and
   e) incorporating flavor into the flavor releasing composition to form flavor releasing cores; wherein the non-cellulosic thermoplastic in the long flavor duration releasing structure helps maintain the consistency of the gum during chewing.

2. The method of claim 1 wherein the sizing step is performed by grinding the cooled flavor releasing composition.

3. The method of claim 1 wherein the step of incorporating flavor into the composition occurs after the step of sizing the cooled composition.

4. The method of claim 1 wherein the porous flavor reservoir material is selected from the group consisting of silica, talc, titanium dioxide, calcium carbonate, mannitol, maltodextrin and mixtures thereof.

5. The method of claim 1 wherein the thermoplastic cellulose material is selected from the group consisting of hydroxypropylcellulose and hydroxypropyl hydroxyethyl cellulose.

6. The method of claim 1 wherein the non-cellulosic thermoplastic polymer is selected from the group consisting of polyvinyl acetate having a weight average molecular weight of greater than 55,000, polyethylene, and mixtures thereof.

7. The method of claim 1 wherein the flavor comprises mint flavor and the non-cellulosic thermoplastic polymer comprises polyvinyl acetate.

8. The method of claim 1 wherein the flavor comprises one or more flavoring agents selected from the group consisting of fruit flavor esters and cinnamic aldehyde, and the non-cellulosic thermoplastic polymer comprises polyethylene.

9. The method of claim 1 wherein the blend further comprises a plasticizer.

10. The method of claim 9 wherein the plasticizer is selected from the group consisting of glycerol monostearate, lecithin, mono and diglycerides, glyceryl lactopalmitate, sorbitan monostearate, triglyceride monostearate, octaglycerol monooleate, polysorbates 65, 60, and 80, acetylated monoglycerides, distilled monoglycerides, distilled propylene glycolmonoester and succinylated monoglycerides.

11. The method of claim 1 wherein the ratio of thermoplastic materials to porous flavor reservoir material is between about 10:1 and about 1:1.

12. The method of claim 1 wherein the step of extruding the composition is carried out at a temperature of at least 180° C.

13. The method of claim 1 further comprising the step of coating the flavor releasing cores with a flavor barrier coating.

14. The method of claim 1 wherein the flavor releasing cores comprise between about 10% and about 40% of flavor based on the total weight of the flavor releasing cores.

15. The method of claim 1 wherein the flavor comprises mint flavor.

16. The method of claim 1 wherein the flavor releasing cores further comprise a high-intensity sweetener.

17. The method of claim 1 wherein the flavor releasing cores further comprise a sensate material.

18. A long flavor duration releasing structure made by the method of claim 1 wherein the structure comprises:
   a) about 30% to about 60% thermoplastic cellulose material, about 5% to about 50% non-cellulosic thermoplastic polymer selected from the group consisting of polyvinyl acetate, polyethylene, and mixtures thereof, and about 10% to about 40% porous flavor reservoir material; and
   b) a flavoring agent incorporated into the structure, wherein the non-cellulosic thermoplastic in the long flavor duration releasing structure helps maintain a consistency during chewing of a chewing gum to which the structure is added.

19. The long flavor duration releasing structure of claim 18 wherein the thermoplastic polymer is selected from the group consisting of polyvinyl acetate having a weight average molecular weight of greater than 55,000, polyethylene, and mixtures thereof.

20. The long flavor duration releasing structure of claim 18 wherein the thermoplastic cellulose material comprises hydroxypropylcellulose.

21. The long flavor duration releasing structure of claim 18 wherein the porous flavor reservoir material is selected from the group consisting of silica, talc, titanium dioxide, calcium carbonate, mannitol, maltodextrin and mixtures thereof.

22. The long flavor duration releasing structure of claim 18 further comprising about 5% to about 25% plasticizer.

23. The long flavor duration releasing structure of claim 18 comprising about 45% hydroxypropylcellulose, about 25% polyvinyl acetate, about 15% silica and about 15% glycerol monostearate.

24. A chewing gum composition with long flavor duration comprising:
   a) a gum base;
   b) a water soluble bulk portion; and
   c) a flavor releasing structure made by the method of claim 1 wherein the structure comprises:
      i) about 30% to about 60% thermoplastic cellulose material, about 5% to about 50% non-cellulosic thermoplastic polymer selected from the group consisting of polyvinyl acetate, polyethylene, and mixtures thereof, and about 10% to about 40% porous flavor reservoir material; and
      ii) a flavoring agent incorporated into the structure
   wherein the non-cellulosic thermoplastic in the flavor releasing structure helps maintain the consistency of the gum during chewing.

25. The chewing gum composition of claim 24 wherein the non-cellulosic thermoplastic polymer is stable at 180° C.

26. The chewing gum composition of claim 24 wherein the gum composition comprises between about 0.5% and about 5% of the flavor releasing structure based on the total weight of the gum composition.

27. The chewing gum composition of claim 24 wherein the flavor releasing structure further comprises about 5% to about 25% plasticizer.

28. The chewing gum composition of claim 24 wherein the flavor releasing structure further comprises color.

29. The chewing gum composition of claim 24 wherein the thermoplastic cellulose material comprises hydroxypropylcellulose, the non-cellulosic thermoplastic material comprises polyvinyl acetate, and the flavor reservoir material comprises silica.

30. The method of claim 1 wherein the thermoplastic cellulose material comprises a combination of two different molecular weight materials.

31. The method of claim 1 wherein the non-cellulose thermoplastic polymer comprises polyvinyl acetate.

* * * * *